United States Patent
Yoshida et al.

(10) Patent No.: US 8,221,511 B2
(45) Date of Patent: Jul. 17, 2012

(54) HYDROGEN PRODUCING APPARATUS

(75) Inventors: Yutaka Yoshida, Mie (JP); Kunihiro Ukai, Nara (JP); Tomonori Aso, Nara (JP); Akira Maenishi, Osaka (JP); Yoichi Kimura, Nara (JP)

(73) Assignee: Panasonic Corporation, Osaka (JP)

( * ) Notice: Subject to any disclaimer, the term of this patent is extended or adjusted under 35 U.S.C. 154(b) by 524 days.

(21) Appl. No.: 12/516,696

(22) PCT Filed: May 28, 2008

(86) PCT No.: PCT/JP2008/001332
§ 371 (c)(1),
(2), (4) Date: May 28, 2009

(87) PCT Pub. No.: WO2008/149516
PCT Pub. Date: Dec. 11, 2008

(65) Prior Publication Data
US 2010/0068106 A1    Mar. 18, 2010

(30) Foreign Application Priority Data
May 31, 2007  (JP) ................. 2007-144779

(51) Int. Cl.
*B01J 7/00*   (2006.01)
*B01J 8/00*   (2006.01)
*C01B 3/36*   (2006.01)
*C01B 6/24*   (2006.01)
*C01B 3/24*   (2006.01)

(52) U.S. Cl. ......... 48/61; 48/197 R; 422/625; 422/626; 423/644; 423/650

(58) Field of Classification Search .......... 48/61, 197 R; 422/625, 626; 423/644, 650
See application file for complete search history.

(56) References Cited

U.S. PATENT DOCUMENTS

| | | |
|---|---|---|
| 5,180,560 A | 1/1993 | Nasser |
| 2001/0002248 A1 | 5/2001 | Ukai et al. |
| 2003/0003033 A1* | 1/2003 | Taguchi et al. ............... 422/198 |

(Continued)

FOREIGN PATENT DOCUMENTS

JP    2-500589    3/1990

(Continued)

OTHER PUBLICATIONS

International Search Report for corresponding application No. PCT/JP2008/001332 completed Aug. 13, 2008.

*Primary Examiner* — Matthew Merkling
(74) *Attorney, Agent, or Firm* — Renner, Otto, Boisselle & Sklar, LLP

(57) ABSTRACT

A hydrogen generating device including a temperature adjustment section 8 for controlling a temperature of a hydrogen-containing gas to be introduced from a reforming section 1 into carbon monoxide reducing sections 2 and 3, the temperature adjustment section 8 including: a heat exchange section 26 having an air path 11 for allowing a cooling air to pass therethrough; an air intake portion 10 having an opening for taking the cooling air into the air path 11; and an air discharging portion 12 having an opening for discharging the cooling air out of the air path 11, wherein the opening of the air intake portion 10 and that of the air discharging portion 12 are facing in a same direction, and the same direction is a vertically upward direction or a vertically downward direction.

6 Claims, 5 Drawing Sheets

U.S. PATENT DOCUMENTS

| | | |
|---|---|---|
| 2003/0035983 A1 | 2/2003 | Ukai et al. |
| 2003/0129100 A1 | 7/2003 | Ukai et al. |

FOREIGN PATENT DOCUMENTS

| | | |
|---|---|---|
| JP | 6-92602 | 4/1994 |
| JP | 2000-119004 | 4/2000 |
| JP | 2000-185902 | 7/2000 |
| JP | 2001-180905 | 7/2001 |
| JP | 2002-128507 | 5/2002 |
| JP | 2005-67975 | 3/2005 |
| JP | 2005-108651 | 4/2005 |
| JP | 2008-88049 | 4/2008 |

* cited by examiner

FIG.1
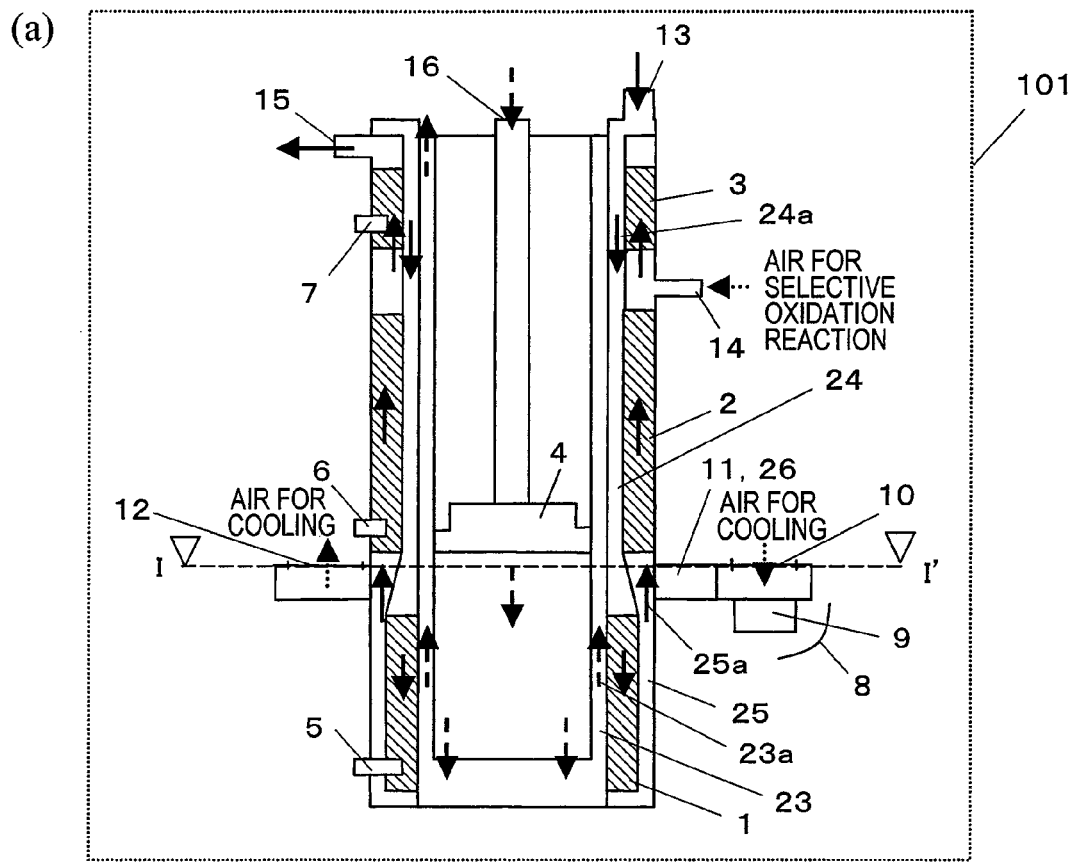
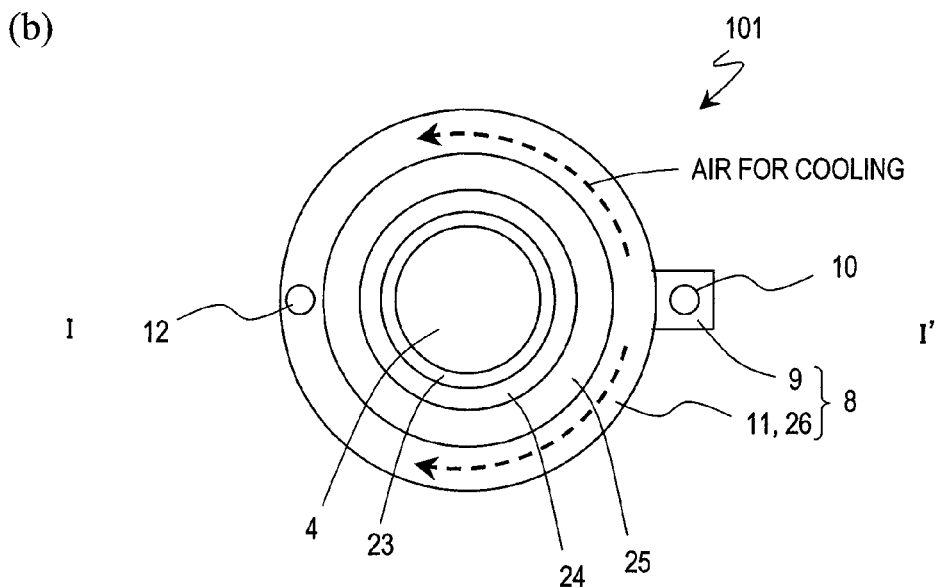

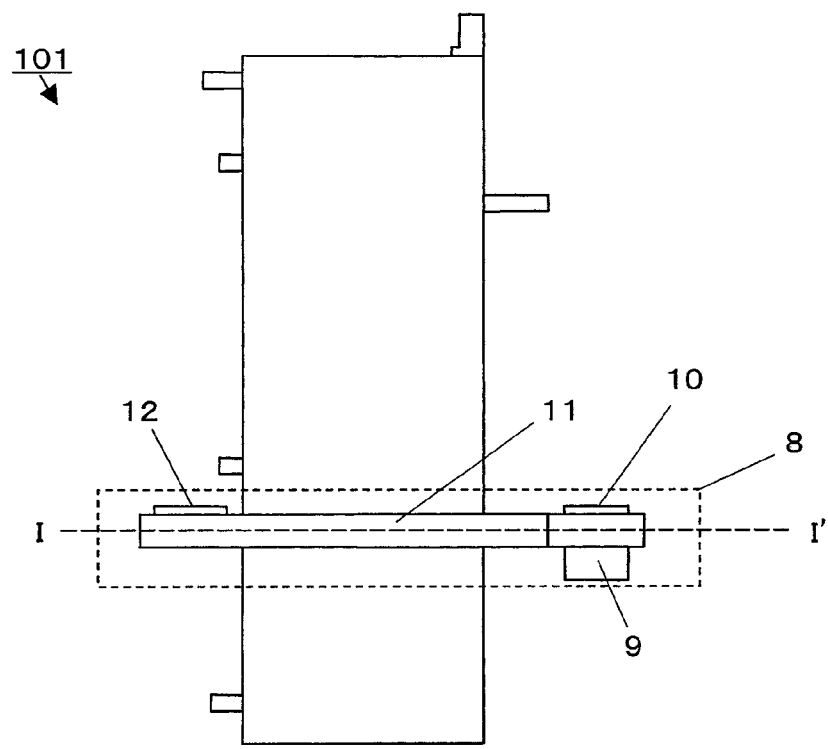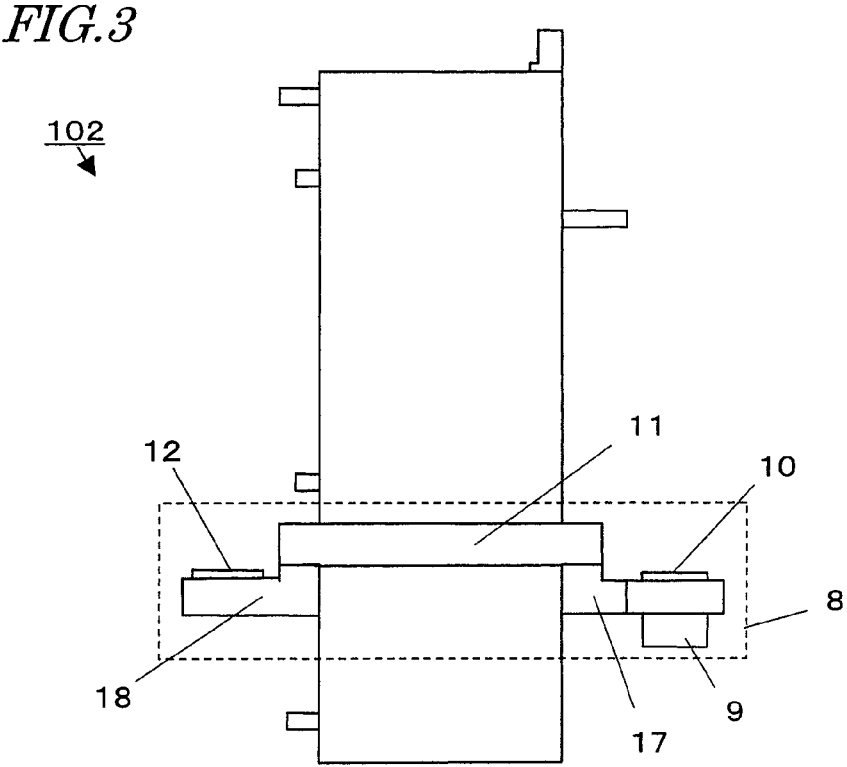

HYDROGEN PRODUCING APPARATUS

TECHNICAL FIELD

The present invention relates to a hydrogen generating device including a reforming section for generating a hydrogen-containing gas through a reforming reaction between a material and a steam, and a carbon monoxide reducing section for reducing carbon monoxide in the hydrogen-containing gas.

BACKGROUND ART

Fuel cells are capable of efficient power generation despite the small size, and therefore have been drawing public attention and have been developed as power-generating devices of distributed energy resources.

A fuel cell uses a hydrogen gas as the fuel for power generation. At present, since there has not been general infrastructure for supplying a hydrogen gas, a fossil material supplied from the existing fossil material infrastructure such as a city gas and a propane gas is used to generate a hydrogen-containing gas, which is used as a fuel. Thus, a fuel cell is provided with a hydrogen generating device for generating a hydrogen-containing gas through steam reforming of the fossil material.

However, in a case where a fossil material is used, there is a problem that carbon monoxide (CO) from the material is contained in the generated hydrogen-containing gas. With a phosphorus acid-type fuel cell or a polymer electrolyte-type fuel cell, if a high concentration of carbon monoxide is contained in the hydrogen-containing gas, the Pt catalyst used in an electrode of the fuel cell may be poisoned by carbon monoxide to thereby substantially lower the output of the fuel cell. Therefore, a hydrogen generating device is provided with a carbon monoxide reducing section for reducing the concentration of carbon monoxide contained in the generated hydrogen-containing gas. The carbon monoxide reducing section includes a shift converter for subjecting carbon monoxide in the hydrogen-containing gas and a steam to a shift reaction using a shift catalyst, and a selective oxidation section for selectively oxidizing carbon monoxide contained in the hydrogen-containing gas having passed through the shift converter using a selective oxidation catalyst.

The carbon monoxide reducing section reduces the carbon monoxide concentration through a catalyst reaction, and the performance thereof is dependent on the catalyst temperature. Therefore, in order to effectively reduce the carbon monoxide concentration, it is important to control the catalyst temperature.

In view of this, Patent Document 1, for example, proposes a configuration for reducing the carbon monoxide concentration to be less than or equal to an intended concentration by controlling the catalyst temperature by air-cooling the hydrogen-containing gas after the reforming reaction. Patent Document 2 proposes a configuration in which the shift catalyst is divided into two portions and placed in series with each other, with a cooling section provided therebetween for air-cooling the hydrogen-containing gas.

[Patent Document 1] Japanese Laid-Open Patent Publication No. 2000-119004

[Patent Document 2] Japanese Laid-Open Patent Publication No. 2002-128507

DISCLOSURE OF INVENTION

Problems to be Solved by the Invention

However, since the configurations of Patent Documents 1 and 2 both utilize air-cooling, it is difficult to accurately regulate the catalyst temperature. With cooling where air-cooling is utilized, even when the catalyst temperature is sufficiently low and there is no need to cool the hydrogen-containing gas (e.g., at the start-up of the device), there may occur a flow of the cooling air due to the draft phenomenon, thereby cooling the hydrogen-containing gas. As a result, the catalyst temperature may become lower than a predetermined temperature, thereby substantially lowering the performance of the carbon monoxide reducing section. Moreover, in order to ensure the performance of the carbon monoxide reducing section, it is necessary to increase the amount of catalyst used in the carbon monoxide reducing section to be greater than the amount needed taking into consideration the range of variation of the catalyst temperature.

On the other hand, while one may consider utilizing water-cooling in order to realize a more accurate temperature control, utilizing water-cooling in a hydrogen generating device of a fuel cell entails many difficulties. For example, the temperature of the hydrogen-containing gas obtained by a reforming reaction is as high as 700° C., for example, and a heat exchange between such a hydrogen-containing gas and a cooling water may result in bumping of the cooling water within the cooling water pipe, thereby adversely influencing the device. Moreover, there is also a problem that the device configuration is complicated, thus failing to realizing a reduction in the size of the device.

As described above, conventional hydrogen generating devices have a problem that it is difficult to strictly control the temperature of the catalyst used in the carbon monoxide reducing section. Therefore, there is a possibility that the carbon monoxide concentration of the hydrogen-containing gas cannot reliably be reduced to an intended concentration, and in order to reliably reduce the carbon monoxide concentration, it is necessary to increase the amount of catalyst used.

The present invention has been made in view of the above, and an objective thereof is to provide a carbon monoxide reducing section for reducing a carbon monoxide concentration in a hydrogen-containing gas generated by a reforming reaction, wherein the temperature of the hydrogen-containing gas is more accurately controlled by utilizing the cooling air to thereby more efficiently reduce the carbon monoxide concentration.

Means for Solving the Problems

A hydrogen generating device of the present invention is a hydrogen generating device including: a reforming section for steam-reforming a material using a reforming catalyst to generate a hydrogen-containing gas; a heating section for supplying, to the reforming section, heat necessary for the reforming reaction; a carbon monoxide reducing section for reducing carbon monoxide in the hydrogen-containing gas using a carbon monoxide reducing catalyst; and a temperature adjustment section for controlling a temperature of the hydrogen-containing gas to be introduced from the reforming section into the carbon monoxide reducing section, the temperature adjustment section including: a heat exchange section having an air path for allowing a cooling air to pass therethrough; an air intake portion having an opening for taking the cooling air into the air path; and an air discharging portion having an opening for discharging the cooling air out of the air path, wherein the opening of the air intake portion and that of the air discharging portion are facing in a same direction, and the same direction is a vertically upward direction or a vertically downward direction.

In a preferred embodiment, the same direction is a vertically downward direction.

It is preferred that the air path includes a portion extending in a direction perpendicular to a vertical direction.

The opening of the air intake portion and that of the air discharging portion may be provided at an equal height.

The air intake portion may include a cooling fan, wherein the opening of the air intake portion is an intake port of the cooling fan.

A reformed gas path is provided for allowing the hydrogen-containing gas generated in the reforming section to pass therethrough, wherein the reformed gas path extends in a vertical direction from the reforming section.

It is preferred that the temperature adjustment section is configured so that there is unlikely to be a convection of air in the air path when the cooling fan is OFF.

It is preferred that the air intake portion and the air discharging portion are thermally insulated by a heat-insulating member.

In a preferred embodiment, the carbon monoxide reducing section includes: a shift converter for performing a shift reaction between carbon monoxide and a steam using a shift catalyst; and a selective oxidation section located downstream of the shift converter for oxidizing carbon monoxide using a selective oxidation catalyst, wherein the temperature adjustment section is provided at least one of between the reforming section and the shift converter and between the shift converter and the selective oxidation section.

EFFECTS OF THE INVENTION

With the hydrogen generating device of the present invention, it is possible to suppress an air flow due to the draft phenomenon occurring between the air intake portion and the air discharging portion of the temperature adjustment section, and it is therefore possible to more strictly control the temperature of the hydrogen-containing gas to be introduced into the carbon monoxide reducing section by the temperature adjustment section. Thus, the temperature of the catalyst used in the carbon monoxide reducing section can be accurately controlled to a temperature suitable for the reaction (a shift reaction, a selective oxidation reaction, etc.), and it is therefore possible to more efficiently reduce the carbon monoxide concentration. Moreover, it is possible to optimize the amount of catalyst used in the carbon monoxide reducing section.

BRIEF DESCRIPTION OF DRAWINGS

[FIGS. 1] (*a*) and (*b*) are a schematic cross-sectional view taken along the vertical direction and a schematic cross-sectional view taken along the horizontal direction, respectively, of a hydrogen generating device according to a first embodiment of the present invention.

[FIG. 2] A schematic side view of a hydrogen generating device according to the first embodiment of the present invention.

[FIG. 3] A schematic side view of another hydrogen generating device according to the first embodiment of the present invention.

Figure 4:
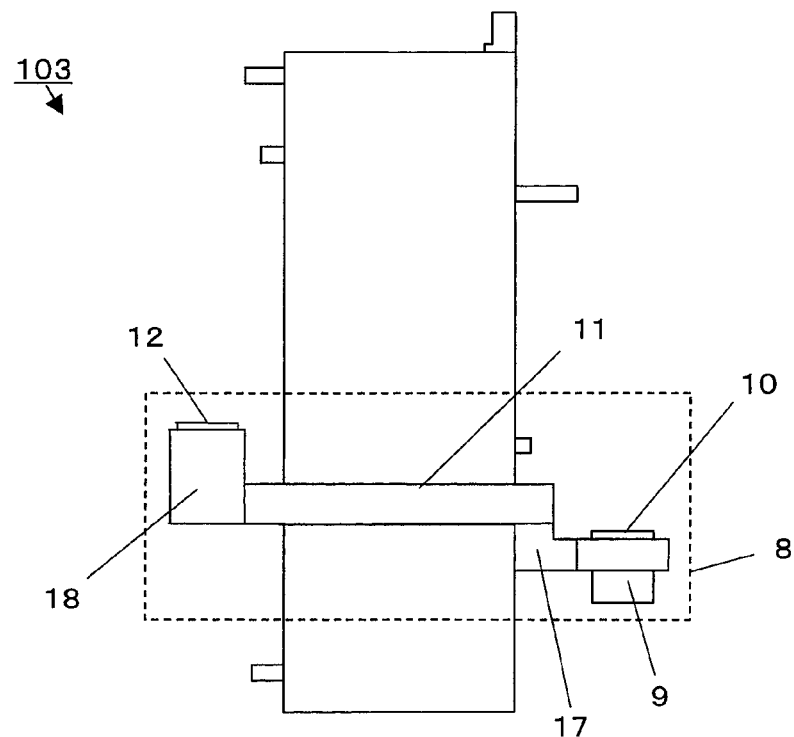
[FIG. 4] A schematic side view of still another hydrogen generating device according to the first embodiment of the present invention.

DESCRIPTION OF THE REFERENCE NUMERALS 1 reforming section
2 shift converter
3 selective oxidation section
4 heating section
5 reforming temperature detection section
6 shift temperature detection section
7 selective oxidation temperature detection section
8, 8' temperature adjustment section
9, 9' air-cooling fan
10, 10' air intake portion
11, 11' air duct
12, 12' air discharging portion
13 material/water inlet portion
14 selective oxidation air inlet portion
15 hydrogen-containing gas outlet portion
16 fuel/combustion air inlet portion
17 air-cooling fan guide
18 outlet guide
20 heat insulator
23 combustion gas passageway
24 material passageway
25 reformed gas passageway
26 heat exchange section

BEST MODE FOR CARRYING OUT THE INVENTION (Embodiment 1)

Referring to the drawings, a first embodiment of a hydrogen generating device according to the present invention will now be described. The present embodiment is a single unit-type hydrogen generating device in which a reforming section, a shift converter and a selective oxidation section are integrally configured together into a cylindrical tubular body.

<Configuration of Hydrogen Generating Device 101>

FIGS. 1(*a*) and (*b*) are a vertical cross-sectional view and a horizontal cross-sectional view, respectively, schematically showing the hydrogen generating device of the present embodiment. FIG. 1(*b*) shows a cross section taken along line I-I' in FIG. 1(*a*). FIG. 2 is a schematic side view of a hydrogen generating device 101.

The hydrogen generating device 101 is provided with a reforming section 1 having an Ru-type reforming catalyst, a shift converter 2 having a Cu—Zn-type shift catalyst, a selective oxidation section 3 having an Ru-type selective oxidation catalyst, a heating section 4, and a temperature adjustment section 8 placed between the reforming section 1 and the shift converter 2.

Herein, the heating section 4 is a burner for heating the reforming section 1. The heating section 4 is placed in a central portion of the tubular body, and combusts the fuel so as to form a flame under the heating section 4. The hydrogen generating device 101 is in a multi-tube structure, in which the reforming section 1, the shift converter 2 and the selective oxidation section 3 are placed in this order from the bottom, arranged about the heating section 4 on the outer side thereof. There are also provided a fuel/combustion air inlet portion 16 extending above the tubular body for supplying the fuel used in the heating section 4, a combustion gas passageway 23 for passing the combustion gas obtained by combusting the fuel in the heating section 4 in a vertically upward direction, a material/water inlet portion 13 extending above the tubular body for supplying water and a material (a hydrocarbon-type material such as a city gas or an LPG) necessary for the reforming reaction, a material/water passageway 24 for sending the material and water to the reforming section 1, a reformed gas passageway 25 for sending the hydrogen-containing gas (reformed gas) obtained by the reforming reaction in the reforming section 1 to the shift converter 2 and to the selective oxidation section 3 in this order, and a hydrogen-containing gas outlet portion 15 for supplying a hydrogen-containing gas, of which carbon monoxide has been reduced through the shift converter 2 and the selective oxidation section 3, to an external device (e.g., a fuel cell). A selective oxidation air inlet portion 14 for supplying an air necessary for the selective oxidation reaction is further provided between the shift converter 2 and the selective oxidation section 3.

The reforming section 1, the shift converter 2 and the selective oxidation section 3 are provided with a reforming catalyst temperature detection section 5, a shift catalyst temperature detection section 6 and a selective oxidation catalyst temperature detection section 7 for detecting the temperatures of the catalysts provided therein or of the gases passing through the catalysts. These detection sections 5, 6 and 7 in the present embodiment are thermocouples.

The temperature adjustment section 8 is placed on the outer wall surface of the hydrogen generating device 101 and below (upstream of) the shift converter 2, and includes an air intake portion 10 having an opening for taking in the air for cooling, a heat exchange section 26 for a heat exchange between the cooling air and the hydrogen-containing gas flowing through the reformed gas passageway 25, an air discharging portion 12 having an opening for discharging the air after the heat exchange, and a cooling fan (air-cooling fan) 9 for forcibly passing the air for cooling from the air intake portion 10 to the air discharging portion 12.

The heat exchange section 26 has an air duct (air path) 11 for horizontally passing the cooling air along the outer wall surface of the hydrogen generating device 101 from the air intake portion 10 toward the air discharging portion 12. As shown in FIG. 2, the air duct 11 is provided along the entire periphery so as to cover a portion of the outer wall surface of the tubular body of the hydrogen generating device 101.

In the temperature adjustment section 8 of the present embodiment, a sirocco fan is used as the air-cooling fan 9. The intake port of the air-cooling fan 9 serves as the opening of the air intake portion 10. The discharge port of the air-cooling fan 9 is connected to the air duct 11. The opening of the air intake portion 10 (i.e., the intake port of the air-cooling fan 9) and the opening of the air discharging portion 12 are provided generally at an equal height and are both facing vertically upward. While the size of the opening of the air intake portion 10 and that of the air discharging portion 12 are not limited to any particular size, the area of the opening of the air discharging portion 12 is preferably greater than or equal to the area of the opening of the air intake portion 10, in view of the pressure loss of the air-cooling fan 9.

Although not shown in FIGS. 1 and 2, it is preferred that a heat insulator is provided so as to cover the outer wall surface of the tubular body in order to prevent the heat radiation from the outer wall surface of the hydrogen generating device 101. The heat insulator is preferably an insulator having a desirable heat-insulating capacity such as a vacuum insulator, with which the air convection in the heat insulator is limited to a minimum.

<Operation of Hydrogen Generating Device 101>

Next, referring to FIGS. 1(*a*) and (*b*), the operation of the hydrogen generating device 101 in the present embodiment will be described.

A fuel and air are supplied from the fuel/combustion air inlet portion 16, and are ignited and combusted in the heating section 4. The description of the detailed operation of ignition is omitted. As the fuel to be combusted in the heating section 4, a material to be reformed, e.g., a hydrocarbon-type material such as a city gas or an LPG, may be used in an initial stage of operation of the hydrogen generating device 101, and as the heating proceeds, the hydrogen-containing gas generated by the hydrogen generating device 101 may be used. In a case where the hydrogen-containing gas generated in the hydrogen generating device 101 is supplied to a fuel cell, the off-gas of the fuel cell may be used as the fuel after supplying the hydrogen-containing gas to the fuel cell.

The combustion exhaust gas after the combustion flows in the vertically upward direction through the combustion gas passageway 23 as indicated by an arrow 23*a*. At this time, it heats the reforming section 1, and then heats the material and water flowing through the material/water passageway 24 to be supplied to the reforming section 1. Then, it is discharged out of the hydrogen generating device 101.

On the other hand, the material and water necessary for the reforming reaction are supplied from the material/water inlet portion 13. In the present embodiment, a city gas whose main component is a natural gas from which an odorant component has been removed through a desulfurizing section (not shown) is used as the material. Water from which impurities have been removed through an ion exchange resin is used as water that is supplied together with the material. It is preferred that there is supplied an amount of water such that about 3 moles of a steam will be present with respect to 1 mole of carbon atoms in the average molecular formula of the material (about 3 in terms of the steam/carbon ratio (S/C)).

The material and water are sent in the vertically downward direction through the material/water passageway 24 to the reforming section 1 as indicated by an arrow 24*a*, and the material is steam-reformed in the reforming section 1. In a case where a hydrocarbon-type material is used, hydrogen, carbon monoxide and carbon dioxide are obtained from the material by the reforming reaction. Then, the hydrogen-containing gas obtained by the reforming reaction is sent through the reformed gas passageway 25 to the shift converter 2 as indicated by an arrow 25*a*, and is converted ($CO+H_2O \rightarrow H_2+CO_2$). The hydrogen-containing gas having passed through the shift converter 2 is sent to the selective oxidation section 3 together with the air necessary for selective oxidation, which is supplied from the selective oxidation air inlet portion 14. In the selective oxidation section 3, carbon monoxide in the hydrogen-containing gas is selectively oxidized ($CO+O_2 \rightarrow CO_2$). Thus, eventually, there is generated a hydrogen-containing gas whose carbon monoxide concentration is reduced to be about 20 ppm or less, and the hydrogen-containing gas is supplied to an external device from the hydrogen-containing gas outlet portion 15.

The amount of combustion in the heating section 4 is controlled based on the temperature of the reforming temperature detection section 5, which is provided on one side of the reforming section 1 where there is the outlet for the hydrogen-containing gas. In the present embodiment, since an Ru-type reforming catalyst is used in the reforming section 1, the amount of combustion is controlled so that the temperature of the reforming temperature detection section 5 is 650° C.

The shift catalyst temperature in the shift converter 2 is controlled by operating the temperature adjustment section 8 based on the temperature of the shift temperature detection section 6, which is provided on one side of the shift converter 2 where there is the flow inlet for the hydrogen-containing gas. In the present embodiment, since a Cu—Zn-type shift catalyst is used as the shift catalyst, the operation of the air-cooling fan 9 is controlled so that the temperature detected by the shift temperature detection section 6 is 220° C.

Specifically, the air-cooling fan 9 is operated to send the air, which has been taken in from the air intake portion 10, along the air duct 11 so as to exchange heat with the hydrogen-containing gas passing through the reformed gas passageway 25 via the outer wall surface of the hydrogen generating device 101, after which the air is discharged from the air discharging portion 12. Thus, the hydrogen-containing gas can be cooled. In the present embodiment, the hydrogen-containing gas after being generated in the reforming section 1 and before being introduced into the shift converter 2 is cooled so that the temperature of the hydrogen-containing gas at the hydrogen-containing gas inlet of the shift converter 2 is decreased to a predetermined temperature. When the temperature of the hydrogen-containing gas at the hydrogen-containing gas inlet is sufficiently low, the operation of the air-cooling fan 9 is inactivated. Thus, the temperature of the shift catalyst used in the shift converter 2 is controlled by controlling the temperature of the hydrogen-containing gas before being introduced into the shift converter 2 by turning ON/OFF the air-cooling fan 9.

The temperature of the selective oxidation catalyst used in the selective oxidation section 3 is controlled by adjusting the amount of air supplied from the selective oxidation air inlet portion 14 based on the temperature of the selective oxidation temperature detection section 7, which is provided on one side of the selective oxidation section 3 where there is the inlet for the hydrogen-containing gas. In the present embodiment, in view of the characteristics of the catalyst used, the amount of air supply is controlled so that the temperature detected by the selective oxidation temperature detection section 7 is 150° C.

Note that the types of the catalysts used in the reforming section 1, the shift converter 2 and the selective oxidation section 3 are not limited to those specified above, and other catalysts may be used. Note that since the preferred catalyst temperature varies depending on the type of the catalyst used, a temperature control according to the preferred catalyst temperature is performed.

<Configuration and Effect Unique to Hydrogen Generating Device 101>

In the temperature adjustment section 8 in the hydrogen generating device 101, the opening of the air intake portion 10 and that of the air discharging portion 12 are both facing vertically upward. Note that these openings may be both facing vertically downward. If the opening of the air intake portion 10 and that of the air discharging portion 12 are facing in the same direction, and the same direction is a vertically upward direction or a vertically downward direction, the air which has been warmed and lightened in the air duct 11 is not likely to go out dominantly through either one of the openings when the operation of the air-cooling fan 9 is inactive, and therefore a natural convection of a certain direction is unlikely to occur. Thus, it is possible to prevent the hydrogen-containing gas to be introduced into the shift converter 2 from being cooled by a natural convection in the air duct 11 when the air-cooling fan 9 is OFF. Thus, it is possible to more accurately control the temperature of the hydrogen-containing gas to be introduced into the shift converter 2 by controlling the operation of the air-cooling fan 9. It is also possible to improve the ability to control the temperature of the hydrogen-containing gas to be introduced into the shift converter 2 so as to follow the switching of the operation of the air-cooling fan 9.

Moreover, since the hydrogen-containing gas before being introduced into the shift converter 2 is cooled, instead of directly cooling the shift catalyst, it is possible to reduce the probability of overcooling a portion of the shift catalyst.

In addition, since it is possible to more accurately control the shift catalyst temperature, the range of change of the shift catalyst temperature during a temperature control is reduced, and as a result, the range of change of the carbon monoxide concentration at the hydrogen-containing gas outlet of the shift converter 2 can also be reduced. If the range of change of the carbon monoxide concentration at the reformed gas outlet of the shift converter 2 is reduced, it is also possible to reduce the amount of air supplied to the hydrogen-containing gas before being introduced into the selective oxidation section 3 which is necessary for the selective oxidation reaction, and therefore it is possible to obtain an effect that the hydrogen concentration of the hydrogen-containing gas output from the hydrogen-containing gas outlet portion 15 of the hydrogen generating device 101 can be increased. Moreover, at the start-up of the device from a room-temperature state, the shift catalyst of the shift converter 2 can be heated primarily by the amount of heat of the hydrogen-containing gas generated in the reforming section 1. At this time, since the convection of air in the air duct 11 is suppressed as described above, it is possible to suppress the decrease in the heating speed of the shift catalyst due to the hydrogen-containing gas being cooled by the convection of air. Thus, there is an advantage that the shift catalyst can be heated quickly when the temperature adjustment section 8 (the air-cooling fan 9) is not operative.

In contrast, with the cooling configuration disclosed in Patent Document 1, the opening of the air intake portion is facing vertically upward and the opening of the air discharging portion vertically downward, and these openings are not facing in the same direction. With the cooling configuration disclosed in Patent Document 2, the opening of the air intake portion and that of the air discharging portion are not facing in the same direction, and the openings are facing neither vertically downward nor vertically upward. In such a case, even if the air-cooling fan is turned OFF, there is a convection of air in the air duct due to a temperature difference, and the air flows out of the air intake portion or the air discharging portion. As a result, there occurs a flow of the air in the air duct due to the draft phenomenon, which cools the shift converter, and it may not be possible to quickly and accurately control the catalyst temperature of the shift converter by the operation of the cooling fan.

Note that while the opening of the air intake portion 10 and that of the air discharging portion 12 are facing vertically upward in the hydrogen reforming device 101, these openings may be facing vertically downward, as are in an embodiment to be described later. If these openings are facing downward with respect to the direction of gravity, the warmed air is unlikely to go out of the openings, and there is an advantage that it is possible to more effectively suppress the occurrence of an air flow due to the draft phenomenon.

It is preferred that the air duct 11 in the present embodiment includes a portion through which the air is allowed to pass in the horizontal direction. In the present specification, the "horizontal direction" refers to a direction perpendicular to the direction of gravity (the vertical direction). Thus, it is possible to more reliably suppress a convection of air occurring in the air duct 11 due to an air temperature difference.

Moreover, it is preferred that the opening of the air intake portion 10 and that of the air discharging portion 12 are provided generally at an equal height. If there is a difference in height between the opening of the air intake portion 10 and the opening of the air discharging portion 12, there occurs a convection due to an air temperature difference in the air-cooling duct 11 and the air flows out of one of the openings that is located higher even when the operation of the air-cooling fan 9 is inactive. As a result, there may occur a flow of the air from the opening located lower to the opening located higher, thereby cooling the shift converter 2. In contrast, if the opening of the air intake portion 10 and that of the air discharging portion 12 are provided generally at an equal height, as are in the present embodiment, the air is unlikely to flow out of a particular opening, and it is therefore possible to prevent the occurrence of an air flow in a certain direction from one opening toward the other opening.

The temperature adjustment section 8 in the present embodiment includes the air-cooling fan 9, and utilizes the intake port of the air-cooling fan 9 as the opening of the air intake portion 10. Thus, it is possible to control the operation of the temperature adjustment section 8 with a simpler configuration. It is preferred to also use a sirocco fan as the air-cooling fan 9. In such a case, it is possible to efficiently send the air from the discharge port to the air duct 11 while suppressing the natural convection by directing the intake port of the sirocco fan in the vertically upward direction and the discharge port thereof in the horizontal direction.

The temperature adjustment section 8 of the present invention is not limited to such a configuration as described above. It may be of any configuration as long as a natural convection of air is unlikely to occur in the air duct 11 when the temperature adjustment section 8 is not operating (when the air-cooling fan 9 is OFF in a case where the air-cooling fan 9 is provided), and the air is forcibly passed from the air intake portion 10 toward the air discharging portion 12 by operating the temperature adjustment section 8. Note that the configuration where "a natural convection is unlikely to occur" includes a configuration where the passage of the air is blocked, such as, for example, a configuration where a baffle plate is provided inside the air duct 11, and a configuration where the air passageway is complicated as is a maze.

Note that in the present specification, "the opening of the air intake portion 10 and that of the air discharging portion 12 facing in the same direction" also includes cases where the directions of these openings are shifted from each other within such a range that the shift catalyst is not substantially cooled even if there occurs a convection of air due to the draft phenomenon. The shift between the directions of the openings is within 20°, for example. Similarly, the direction of the opening "being a vertically upward direction or a vertically downward direction" also includes cases where the direction of the opening is shifted from the vertically upward direction or the vertically downward direction within such a range as specified above. For example, "the vertically upward direction" includes a direction at an angle of within ±10° with respect to the upward direction along the direction of gravity, and "the vertically downward direction" includes a direction at an angle of within ±10° with respect to the direction of gravity. Moreover, "the opening of the air intake portion 10 and that of the air discharging portion 12 being provided generally at an equal height" also includes cases where there is a difference in height between these openings within such a range as specified above. Note that "the height of the opening" refers to the height of the center of the opening.

The temperature adjustment section 8 of the present invention is not limited to any particular configuration as long as the temperature of the catalyst used in the carbon monoxide reducing section can be controlled, and may be provided between the reforming section 1 and the shift converter 2 for cooling the hydrogen-containing gas before being sent to the shift converter 2, or may be provided between the shift converter 2 and the selective oxidation section 3 for cooling the hydrogen-containing gas after passing through the shift converter 2 and before being sent to the selective oxidation section 3. Alternatively, the temperature adjustment section 8 may be provided between the reforming section 1 and the shift converter 2, and between the shift converter 2 and the selective oxidation section 3. Moreover, as disclosed in Patent Document 2, the shift catalyst may be divided and placed in two locations with respect to the flow of the hydrogen-containing gas, with the temperature adjustment section 8 being placed so as to cool the hydrogen-containing gas passing therebetween.

<Other Configurations of Temperature Adjustment Section 8>

FIG. 3 is a schematic side view of another hydrogen generating device of the present embodiment. For the sake of simplicity, like elements to those of the hydrogen generating device 101 are denoted by like reference numerals and will not be described below.

In a hydrogen generating device 102 shown in FIG. 3, the temperature adjustment section 8 includes a cooling fan guide 17 placed between the air duct 11 and the air-cooling fan 9, and an outlet guide 18 placed on one side of the air duct 11 where there is the air discharging portion 12. The cooling fan guide 17 and the outlet guide 18 are provided below the air duct 11. The opening of the air intake portion 10 and that of the air discharging port 12 are both facing vertically upward, and are provided at an equal height. With such a configuration, there is a difference in height across the temperature adjustment section 8, and the air does not flow in the horizontal direction from the air intake portion 10 toward the air discharging portion 12. However, since the opening of the air intake portion 10 and that of the air discharging port 12 are facing in the same direction (the vertically upward direction) and are provided at an equal height, it is possible to suppress the occurrence of an air flow in the air duct 11 due to the draft phenomenon, and as a result, it is possible to realize an accurate temperature control.

FIG. 4 is a schematic side view of still another hydrogen generating device of the present embodiment. For the sake of simplicity, like elements to those of the hydrogen generating device 102 shown in FIG. 3 are denoted by like reference numerals and will not be described below.

In a hydrogen generating device 103 shown in FIG. 4, the cooling fan guide 17 is provided below the air duct 11, and the outlet guide 18 is extending in an upward direction from the air duct 11. Moreover, although not shown in the figure, it is different from the hydrogen generating devices 101 and 102 described above in that the heat-insulating property of the outlet guide 18 and the cooling fan guide 17 is improved. With this configuration, the opening of the air discharging portion 12 and the opening of the air intake portion 10 are not located at an equal height, but the openings are both facing in the vertically upward direction, thereby suppressing the convection of air in the air duct 11. Moreover, since the outlet guide 18 and the cooling fan guide 17 are thermally insulated, and there occurs no significant temperature difference inside the outlet guide 18 and the cooling fan guide 17, it is possible to effectively prevent the occurrence of an air flow due to the draft phenomenon.

Figure 5:
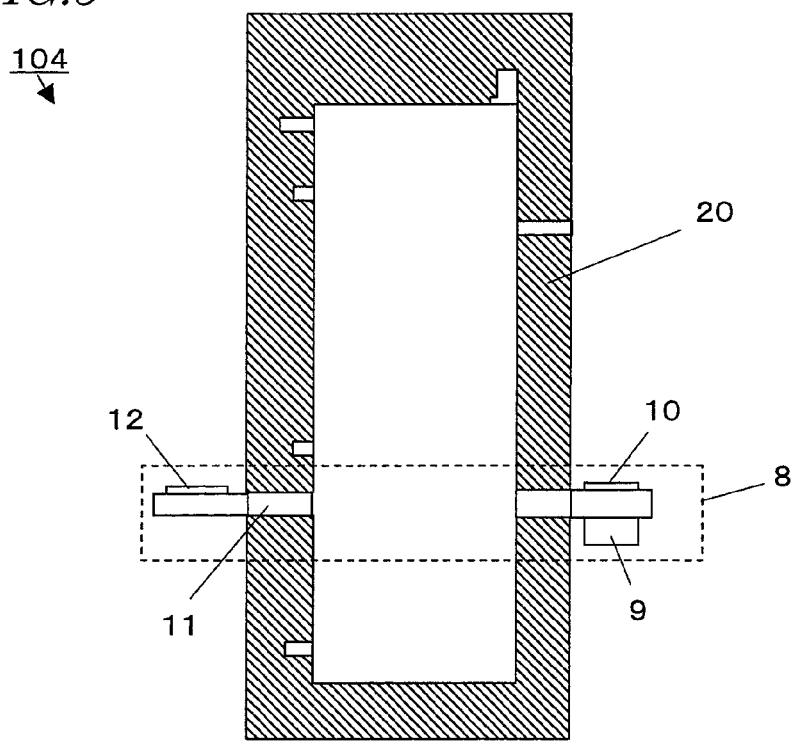
[FIG. 5] A schematic side view of still another hydrogen generating device according to the first embodiment of the present invention.

FIG. 5 is a schematic side view of still another hydrogen generating device of the present embodiment. For the sake of simplicity, like elements to those of the hydrogen generating device 101 shown in FIG. 1 are denoted by like reference numerals and will not be described below.

A hydrogen generating device 104 shown in FIG. 5 is different from the hydrogen generating device 101 in that the air duct 11 is formed by using a heat insulator 20 provided on the outside of the outer wall surface. Specifically, the inside of the heat insulator 20, which is on the outer side of the outer wall surface of the hydrogen generating device 101, is partially shaved to thereby form a portion (air path) through which the air passes around the outer wall surface of the hydrogen generating device 101. Moreover, the air-cooling fan 9 is provided on the outer wall surface of the heat insulator 20 so that the intake port of the air-cooling fan 9 serves as the opening of the air intake portion 10. With this configuration, there is no longer needed a member forming the air duct 11.

(Embodiment 2)

Referring to the drawings, a hydrogen generating device according to a second embodiment of the present invention will now be described. The present embodiment is different from the first embodiment described above with reference to FIG. 1 to FIG. 5 in that the opening of the air intake portion and that of the air discharging portion are both facing vertically downward.

Figure 6:
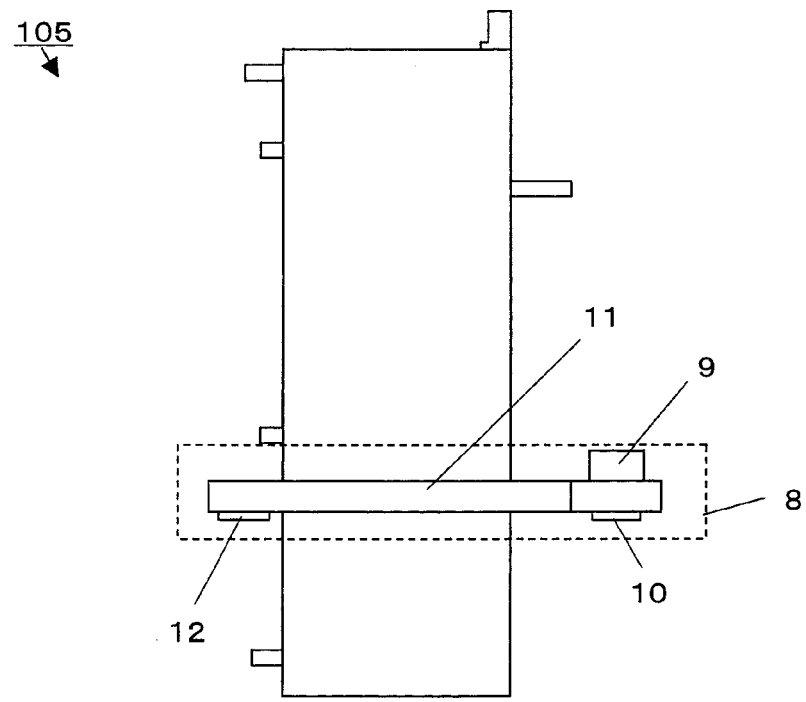
[FIG. 6] A schematic side view of a hydrogen generating device according to a second embodiment of the present invention.

FIG. 6 is a schematic side view of a hydrogen generating device of the present embodiment. For the sake of simplicity, like elements to those of the hydrogen generating device 101 shown in FIG. 1 are denoted by like reference numerals and will not be described below.

In the present embodiment, the opening of the air intake portion 10 and that of the air discharging portion 12 in the temperature adjustment section 8 are both facing vertically downward. Thus, by providing the openings in a downward direction with respect to the direction of gravity, it is possible to effectively suppress the occurrence of an air flow due to the draft phenomenon. Moreover, in the present embodiment, these openings are generally at an equal height, and therefore it is possible to more reliably suppress the occurrence of an air flow.

Figure 7:
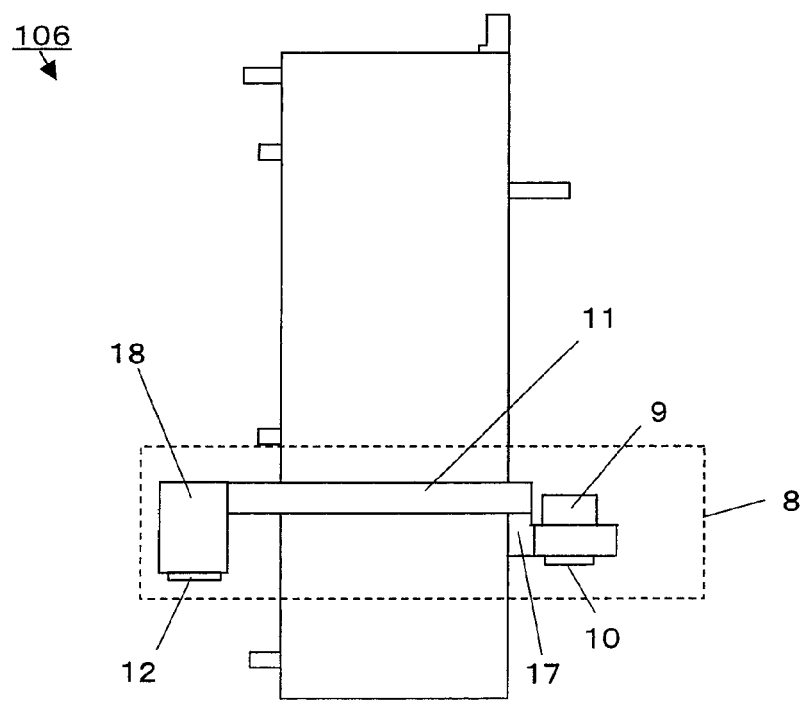
[FIG. 7] A schematic side view of another hydrogen generating device according to the second embodiment of the present invention.

FIG. 7 is a schematic side view of another hydrogen generating device of the present embodiment. As shown in FIG. 7, the temperature adjustment section 8 may include the cooling fan guide 17 placed between the air duct 11 and the air-cooling fan 9, and the outlet guide 18 placed on one side of the air duct 11 where there is the air discharging portion 12. For example, the opening of the air discharging portion 12 may be located above the opening of the air intake portion 10, as shown in the figure. Even where the opening of the air intake portion 10 and the opening of the air discharging portion 12 are at different heights, the convection of air is unlikely to occur in the air duct 11 if these openings are both facing vertically downward. Thus, it is possible to more accurately adjust the catalyst temperature by controlling the operation of the air-cooling fan 9.

Figure 8:
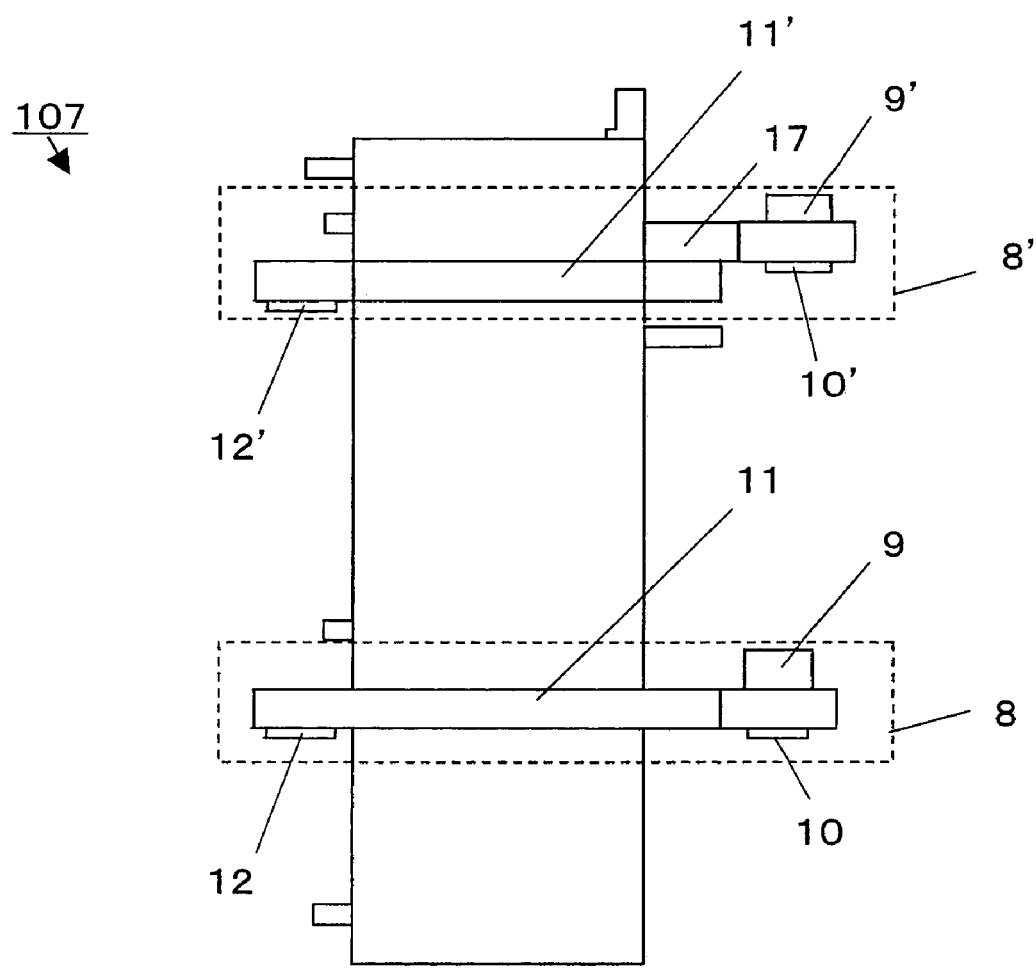
[FIG. 8] A schematic side view of still another hydrogen generating device according to the second embodiment of the present invention.

As described above, the hydrogen generating device of the present embodiment includes a plurality of temperature adjustment sections 8. FIG. 8 is a schematic side view illustrating a hydrogen generating device including a plurality of temperature adjustment sections.

A hydrogen generating device 107 shown in FIG. 8 includes a temperature adjustment section 8 for cooling the hydrogen-containing gas before being introduced into the shift converter 2, and a temperature adjustment section 8' for cooling the hydrogen-containing gas before being introduced into the selective oxidation section 3. Although the temperature adjustment sections 8 and 8' are not limited to any particular configuration, it is preferred that they both have a configuration such that a natural convection of air is unlikely to occur in the air ducts 11 and 11'. Note that the hydrogen generating device of the present invention may include three or more temperature adjustment sections.

The hydrogen generating device of Embodiments 1 and described above is a single unit-type hydrogen generating device in which the reforming section 1, the shift converter 2 and the selective oxidation section 3 are integrally configured together inside a single tubular body. Alternatively, the reforming section 1, the shift converter 2 and the selective oxidation section 3 may be configured separately from one another. Also in such a case, the temperature adjustment section 8 can be arranged so as to cool the hydrogen-containing gas before being introduced into the shift converter 2 or the selective oxidation section 3.

Industrial Applicability

The present invention is widely applicable to hydrogen generating devices including a carbon monoxide reducing section for reducing carbon monoxide in a hydrogen-containing gas. Particularly, when it is applied to hydrogen generating devices such that the reforming reaction temperature is high (600° C. or more, e.g., 650° C.) and the reforming section and the carbon monoxide reducing section are integrally configured together, it is advantageous in that the controllability of the catalyst temperature can be increased significantly over the prior art.

The present invention is suitably used in a hydrogen generating device used in a fuel cell power-generating system.

The invention claimed is:

1. A hydrogen generating device, comprising:
a reforming section for steam-reforming a material using a reforming catalyst to generate a hydrogen-containing gas;
a heating section for supplying, to the reforming section, heat necessary for the reforming reaction;
a carbon monoxide reducing section for reducing carbon monoxide in the hydrogen-containing gas using a carbon monoxide reducing catalyst;
a vertically oriented reformed gas passageway for vertically passing the hydrogen-containing gas generated in the reforming section and before being introduced into the carbon monoxide reducing section; and
a temperature adjustment section for controlling a temperature of the hydrogen-containing gas to be introduced from the reforming section into the carbon monoxide reducing section,
the temperature adjustment section including:
a heat exchange section having an air path for allowing a cooling air to pass therethrough;
an air intake portion having an opening for taking the cooling air into the air path; and
an air discharging portion having an opening for discharging the cooling air out of the air path, wherein
the air path includes a horizontally oriented air duct for horizontally passing the cooling air, the horizontally oriented air duct adjacent the vertically oriented reformed gas passageway in the heat exchange section;
the air intake portion includes a cooling fan, wherein the opening of the air intake portion is an intake port of the cooling fan; and
the opening of the air intake portion and that of the air discharging portion are facing in a same direction, and the same direction is a vertically upward direction or a vertically downward direction;

the device further including a material passageway for passing the material to the reforming section, wherein, in a horizontal cross section of the horizontally oriented air duct, the vertically oriented reformed gas passageway has a ring shape and is arranged between the material passageway and the horizontally oriented air duct.

2. The hydrogen generating device of claim 1, wherein the same direction is a vertically downward direction.

3. The hydrogen generating device of claim 1, wherein the opening of the air intake portion and that of the air discharging portion are provided at an equal height.

4. The hydrogen generating device of claim 1, wherein the temperature adjustment section is configured so that there is unlikely to be a convection of air in the air path when the cooling fan is OFF.

5. The hydrogen generating device of claim 1, wherein the air intake portion and the air discharging portion are thermally insulated by a heat-insulating member.

6. The hydrogen generating device of claim 1, the carbon monoxide reducing section including:
   a shift converter for performing a shift reaction between carbon monoxide and a steam using a shift catalyst; and
   a selective oxidation section located downstream of the shift converter for oxidizing carbon monoxide using a selective oxidation catalyst, wherein
the temperature adjustment section is provided at least one of between the reforming section and the shift converter and between the shift converter and the selective oxidation section.

* * * * *